United States Patent [19]

Prud'Homme et al.

[11] Patent Number: 5,616,339
[45] Date of Patent: Apr. 1, 1997

[54] CHITOSAN-BASED NUTRIENT OR MEDICINAL COMPOSITIONS FOR ADMINISTRATION TO RUMINANTS

[75] Inventors: Christian Prud'Homme, Lyon; Jean-Francois Rostaing, Chuzelles, both of France

[73] Assignee: Rhone-Poulenc Nutrition Animale, Antony, France

[21] Appl. No.: 414,322

[22] Filed: Mar. 31, 1995

Related U.S. Application Data

[63] Continuation-in-part of Ser. No. 123,090, Sep. 17, 1993, abandoned.

[30] Foreign Application Priority Data

Sep. 18, 1992 [FR] France .................................. 92 11129

[51] Int. Cl.⁶ ...................................... A23K 1/18
[52] U.S. Cl. ........................ 424/438; 424/489; 424/498; 426/807
[58] Field of Search ................................ 424/438, 498, 424/489; 426/807

[56] References Cited

U.S. PATENT DOCUMENTS

| | | | |
|---|---|---|---|
| 2,799,241 | 7/1957 | Wurster | 118/24 |
| 4,066,754 | 1/1978 | Chou | 424/438 |
| 4,424,346 | 1/1984 | Hall et al. | 424/180 |
| 4,533,557 | 8/1985 | Maruyama et al. | 426/61 |
| 4,832,967 | 5/1989 | Autant et al. | |
| 4,877,621 | 10/1989 | Ardaillon et al. | 424/438 |
| 4,983,403 | 1/1991 | Ardaillon et al. | 426/2 |
| 5,077,052 | 12/1991 | Franzoni et al. | 424/438 |
| 5,166,187 | 11/1992 | Collombell et al. | 514/21 |

FOREIGN PATENT DOCUMENTS

| | | |
|---|---|---|
| 587182 | 3/1994 | European Pat. Off. . |
| 93/6859 | 6/1994 | South Africa . |

OTHER PUBLICATIONS

Yokomori et al., *Chemical Abstracts*, vol.120, 1994, #253409.
Sasaoka et al., *Chemical Abstracts*, vol. 110, 1988, #172052.
Prud'homme et al., *Chemical Abstracts*, vol. 116, 1991, #91415.
Pellegrino et al., *Chemical Abstracts*, vol. 110, 1990, #67708.
No et al., *Chemical Abstracts*, vol. 110, 1990, #198567.
Oke et al., *Chemical Abstracts*, vol. 91, 1979, #4112.
Pellegrino et al., *Chemical Abstracts*, vol. 115, 1990, #67708.
English translation of J 63–317050.

*Primary Examiner*—D. Gabrielle Phelan
*Attorney, Agent, or Firm*—Finnegan, Henderson, Farabow, Garrett & Dunner, L.L.P.

[57] ABSTRACT

A nutrient or medicinal composition for administration to ruminants, which comprises one or more biologically active substances coated with a composition comprising a chitosan salt and at least one fat.

45 Claims, No Drawings

CHITOSAN-BASED NUTRIENT OR MEDICINAL COMPOSITIONS FOR ADMINISTRATION TO RUMINANTS

This application is a continuation-in-part application of Ser. No. 08/123,090 filed Sep. 17, 1993, now abandoned.

The present invention is directed to new compositions, useful as nutrients or medicaments, which contain one or more biologically active substances, preferably for the feeding of ruminants. In general, these compositions are stable in an aqueous medium in which the pH is at least 5.5, which corresponds to the pH of the rumen, and yet are capable of releasing the biologically active substance(s) in the digestive tract in a post-ruminal compartment. The present invention is also directed to new methods of preparing compositions for the feeding of ruminants.

Without a protective coating, many biologically active substances, useful as nutrients or for therapeutic purposes, are destroyed in the rumen of ruminants. This destruction is due in large part to the presence of microorganisms that reside in the rumen to assist in digestion of amylaceous material and the residence time of active materials in the rumen, which often lasts an average of 15 to 20 hours. During this relatively long period of time, many labile biologically active agents are degraded or destroyed. Many solutions have already been proposed that can protect these substances, and then subsequently release them in the digestive tract where they are less likely to be degraded.

Accordingly, there is a need for compositions which are stable in the medium of the rumen and which enable a biologically active substance (agent) to be released in a post-rumenal compartment of the digestive tract, such as the abomasum and/or the intestine.

Many systems are known that can provide protection, in the medium of the rumen, and release of the active substance or compound in the fourth stomach/abomasum or the intestines. Two major types of compositions have been proposed as protective coatings for biologically active agents in the rumen. One type of composition permits a release of the biologically active agent, which is caused solely by a chemical phenomenon, due to the difference in pH between the rumen and the abomasum. Among this type of composition are pH-sensitive polymers such as copolymers of styrene and vinyl pyridine, which are described in U.S. Pat. Nos. 4,877,621 and 4,832,967. This type of composition permits excellent protection of a biologically active agent, but can possess a drawback if governmental regulatory authorities and consumers view synthetic chemical materials with disfavor.

Also among this first type of composition, where release of the biologically active agent is due to a chemical phenomenon, are compositions based on chitosan and carboxylic acids, which are described in French Patent. No. 2,524,269. Disadvantageously, these compositions contain less than 60% by weight, and more commonly less than 30% by weight, of the biologically active agent, to permit protection in the rumen of 80 to 90% of the material over 24 hours. In addition, these compositions also contain a significant amount (20 to 30% by weight) of one or a number of pH-sensitive inorganic fillers. Mention may further be made, in the context of these compositions containing chitosan and carboxylic acids, of European Patent Application EP 588,707, which describes the coating of nutrient or therapeutic substances by an aqueous emulsion containing a chitosan salt, with chitosan acetate being given as the sole example, and one or a number of fatty substances chosen particularly from fatty acids and glycerol. It was preferred, in that application, to use a mixture of saturated fatty acid, especially stearic acid, and of unsaturated fatty acid, especially oleic acid.

A second type of composition for the administration of biologically active agents to ruminants utilizes the enzymatic hydrolysis of natural compounds, such as zein, to effect release of the biologically active material. Such compositions are described in U.S. Pat. No. 4,983,403 and European Patent Application EP 0,406,041. This type of composition, like the above, permits excellent protection of the biologically active agent in the rumen and good post rumen release. Disadvantageously, however, zein is soluble only in organic solvents. This solubility problem requires manufacturers of these compositions to spray zein dissolved in a solvent onto the active agents and then to recover the solvent, a procedure which can be expensive.

SUMMARY OF THE INVENTION

It is therefore an object of the present invention to provide compositions for administration to ruminants which are able to substantially retain the active agent, preferably 80% of the active agent, in the rumen without degradation for at least 6 hours, preferably 24 hours, and to permit substantial release of the active principle, preferably at least 50%, and more preferably at least 80% of the active principle, in less than 6 hours in the abomasum and/or the intestine. It is also an object of the present invention to provide a composition for administration to ruminants which contains at least 60% by weight of the active agent and the largest possible amount of naturally-occurring protective compounds which are also recognized as having nutritional quality for the animals.

In accordance with these and other objectives, a first embodiment of the present invention is directed to a composition for administration to ruminants, comprising a biologically active substance coated with a coating composition which comprises:

(a) a chitosan salt, which is present in the coating composition in an amount preferably greater than 0% by weight of the coating composition, expressed in chitosan equivalents, and not greater than 10% by weight of the coating composition, expressed in chitosan equivalents; and (b) a fat or a mixture of fats which has a melting point of more than 45° C., wherein at least 80% of the biologically active substance in the composition is retained in the rumen without degradation for at least six hours and wherein at least 50% of the biologically active substance is released in the abomasum and/or intestine in less than six hours.

A second embodiment of the invention is directed to a composition comprising a biologically active substance coated with a coating composition which comprises:

(a) from 1 to 10% by weight of a chitosan salt, expressed in chitosan equivalents; and (b) from 99 to 90% by weight of at least one fat which has a melting point of more than 45° C.

A third embodiment of the invention relates to an animal feed composition with improved protection, especially with regard to the stability properties in the rumen, of nutrient or therapeutic substances and preferably of hygroscopic active substances. This embodiment is directed to a composition for administration to ruminants comprising at least one nutrient or medicinal, biologically active substance coated with a coating composition which comprises:

(a) from 1 to 5% by weight of at least one chitosan salt, expressed in chitosan equivalents, wherein said chitosan salt is a salt of a monocarboxylic organic acid that may be substituted by an alkyl chain, wherein the main alkyl chain of said monocarboxylic organic acid carrying the carboxyl group contains 3 to 6 carbon atoms; and (b) from 99 to 95% by weight of a fat or a mixture of fats which has a melting point of greater than 45° C.

A further embodiment of the present invention is directed to a process for preparing a composition for administration to ruminants, which comprises spraying an aqueous emulsion of a coating composition, which comprises from 1 to 10% by weight of a chitosan salt, expressed in chitosan equivalents, and from 99 to 90% by weight of at least one fat which has a melting point of more than 45° C., onto granules of a biologically active agent.

An additional embodiment of the present invention is directed to a process for preparing a composition for administration to ruminants, which comprises spraying an aqueous emulsion of a coating composition, which comprises from 1 to 5% by weight of a chitosan salt, expressed in chitosan equivalents, and from 99 to 95% by weight of at least one fat which has a melting point of greater than 45° C., onto granules of biologically active substance.

Throughout the description, the level of chitosan salt(s) is expressed as chitosan equivalents.

DETAILED DESCRIPTION OF THE PREFERRED EMBODIMENTS

The present invention is directed to new compositions for administration to ruminants, which contain a biologically active agent, such as a therapeutically active agent or nutrient composition. The inventive compositions may comprise a composition for administration to ruminants, comprising a biologically active substance coated with a coating composition which comprises:

(a) a chitosan salt, the salt being present in the coating composition in an amount greater than 0% by weight of the coating composition, expressed in chitosan equivalents, and not greater than 10% by weight of the coating composition, expressed in chitosan equivalents; and (b) a fat or a mixture of fats which has a melting point of more than 45° C., wherein at least 80% of the biologically active substance in the composition is retained in the rumen without degradation for at least six hours and wherein at least 50% of the biologically active substance is released in the abomasum and/or intestine in less than six hours. Preferably, the chitosan salt is present in an amount of at least 1% by weight of the coating composition, expressed in chitosan equivalents, and not greater than 10% by weight of the coating composition, expressed in chitosan equivalents.

The inventive composition preferably comprises a biologically active agent coated with a coating composition, which comprises:

(a) from 1 to 10% by weight of a chitosan salt, expressed in terms of chitosan equivalents; and (b) from 99 to 90% by weight of at least one fat, i.e., a single fat or a mixture of fats, which has a melting point of more than 45° C. (meaning that the single fat or mixture of fats has a melting point of more than 45° C.). Preferably, the coating composition contains from 1 to 5% by weight of a chitosan salt.

A particularly preferred coating composition according to the present invention comprises:

(a) from 3 to 5% by weight of a chitosan salt, expressed in terms of chitosan equivalents;

(b) from 45 to 97% by weight of at least one fat which has a melting point of more than 50° C.; and (c) from 0 to 50% by weight of at least one fat which has a melting point of less than 25° C. (meaning that the single fat or mixture of fats has a melting point of less than 25° C.). Assuming that (c) is greater than 0%, the melting point of the combination of the mixture of fats (b) and (c) is preferably more than 45° C.

A more particularly preferred coating composition according to the present invention comprises:

(a) from 3 to 5% by weight of a chitosan salt, expressed in terms of chitosan equivalents;

(b) from 55 to 92% by weight of a fat or mixture of fats, which has a melting point of more than 50° C.; and (c) from 5 to 40% by weight of one or more fats which has a melting point of less than 25° C. The melting point of the combination of the mixture of fats (b) and (c) is preferably more than 45° C.

More preferably, the coating composition comprises:

(a) from 1 to 5% by weight of at least one chitosan salt, expressed in chitosan equivalents, wherein said chitosan salt is a salt of a monocarboxylic organic acid that may be substituted by an alkyl chain, wherein the main alkyl chain of said monocarboxylic organic acid carrying the carboxyl group contains 3 to 6 carbon atoms; and (b) from 99 to 95% by weight of a fat or a mixture of fats that has a melting point of greater than 45° C.

Still more preferably, the coating composition comprises:

(a) from 3 to 5% by weight of said chitosan salt, expressed in chitosan equivalents, wherein said chitosan salt is a salt of a monocarboxylic organic acid selected from propionic acid, butyric acid, valeric acid, and caproic acid, and further wherein said chitosan salt is a salt of a mixture of one of said monocarboxylic organic acids and at least one carboxylic acid having a shorter alkyl chain than the main alkyl chain of said monocarboxylic organic acid (b) from 55 to 92% by weight of a fat or a mixture of fats having a melting point greater than 50° C.; and (c) from 5 to 40% by weight of a fat or of a mixture of fats having a melting point of less than 25° C.

Chitosan salts are generally well known in the art and may be from various origins, also well known in the art. The chitosan salts that may be employed in the inventive composition may be any acceptable chitosan salt, particularly for nutrient or medicinal application, and preferably is chosen from among chitosan chloride, chitosan acetate, chitosan citrate, chitosan formate, chitosan propionate and chitosan pyruvate, or, more generally, any water-soluble monocarboxylic chitosan salt. The chitosan salt may be chitosan acetate. In accordance with one aspect of the present invention, a mixture of chitosan salts may also be used if necessary. A mixture of chitosan salts is preferably used when the compositions of the present invention encounter non-dissolution of the chitosan source, which one skilled in the art could readily determine. These chitosan salts are generally commercially available, from companies such as SIGMA®, or may be prepared by any of the methods known to those skilled in the art.

More preferably, the chitosan salts can be chosen from a salt of a monocarboxylic organic acid selected from propionic acid, butyric acid, valeric acid, caproic acid (which is the same as hexanoic or hexoic acid), and ethylhexanoic acid and from a salt of a mixture of one of these monocarboxylic organic acids and at least one carboxylic acid having a shorter alkyl chain than the main alkyl chain of the monocarboxylic organic acid. It is preferable, among all these salts, to use chitosan valerate. If a mixture of salts is used, it is preferred that the salts be a mixture of caproic acid and acetic acid. When the salt is formed at the time of use, it is preferable to use an amount of carboxylic acid containing 3 to 6 carbon atoms in the main alkyl chain of approximately 1 mole per mole equivalent of free amine group in the chitosan. The possible substituent which is an alkyl chain preferably contains 1 to 3 carbon atoms.

Fats and mixtures of fats having a melting point of more than 45° C. and preferably more than 50° C. are well-known in the art. Such fats include, for example, fatty acids, preferably containing 12 to 22 carbon atoms, such as stearic acid, behenic acid, lauric acid and myristic acid, or mixtures thereof with stearin; esters of fatty acids, such as glyceryl esters; fatty alcohols in which the fatty chain contains from 12 to 22 carbon atoms; paraffins; hydrogenated vegetable or animal oils; and waxes, such as beef tallow, rice wax, candelita wax, lanolin, carnauba wax and beeswax. The fats may be used in pure form or, preferably, in a mixture such as stearin. Preferably, the fat having a melting point of more than 50° C. is stearic acid.

The glyceryl esters of fatty acids which may be employed in the present composition may be chosen from glyceryl monoesters, glyceryl diesters and glyceryl triesters. Such glyceryl esters are generally commercially available as a mixture. For example, a mixture of glyceryl behenate monoester and triester is commercially available from Gatefosse under the name Compritol. Similarly, a mixture of glyceryl monopalmitate and monosterate is available from Gatefosse under the name Geleol.

Fats and mixtures of fats which have a melting point of less than 25° C. are also well known in the art. Such fats include unsaturated fatty acids having from 12 to 22 carbon atoms, either in the pure form, such as oleic acid, or in a mixture, such as the food oils, e.g., rapeseed oil, sunflower oil, coconut oil, ground nut oil, corn oil, and olive oil. Preferably, the fat having a melting point of less than 25° C. is oleic acid.

The biologically active substance employed in the present invention may be any biologically active agent which is degraded in the rumen of ruminants. The biologically active agent may be a nutrient, such as, an essential amino acid such as methionine, lysine, tryptophan or mixtures thereof. The biologically active agent may also be a therapeutically active agent, such as a vitamin, antibiotic, antiparasitic agent or hormone. Collectively, the biologically active materials can be referred to as biologically active agents, substances, or principles.

A particularly preferred biologically active agent is methionine. In a composition containing methionine, the coating composition can comprise:

(a) 3% by weight of chitosan acetate;.

(b) 90% by weight of stearic acid; and (c) 7% by weight of oleic acid.

The most preferred composition for coating cogranules based on methionine and lysine hydrochloride contains by weight:

(a) 3% of chitosan valerate;

(b) 67% of stearic acid; and (c) 30% of oleic acid.

Preferred compositions according to the present invention contain from 60 to 90% by weight, more preferably 70 to 80% by weight, of a biologically active agent which is degradable in the paunch of ruminants and contains from 4 to 25% by weight, more preferably 10 to 25% by weight, of the coating composition of chitosan salts and fats. To make up 100% by weight, the compositions may also include acceptable adjuvants and excipients, particularly those useful for nutrient or medicinal application. Preferably, the compositions contain a binding agent, such as a mixture of ethylcellulose and stearic acid, preferably in an amount of from 5 to 25% by weight, preferably about 11% by weight, of the total composition to form a granule with the biologically active agent, as described in French Patent application No. 91/08,280 and U.S. Pat. No. 719,309, the disclosures of which are herein specifically incorporated by reference. The nutrient or medicinal composition may also be made up to 100% by the binding agent, which may be used preferably in accordance with U.S. Pat. No. 5,290,560, the disclosure of which is incorporated herein by reference, to form the granule. Such a granule preferably has a diameter of between 0.6 and 2.5 mm, more preferably between 0.8 and 2.0 mm. The coating layer on the composition is preferably between 20 and 200 μm thick, more preferably between 60 and 120 μm.

The composition according to the present invention may be prepared without the use of organic solvents. Preferably, the composition is prepared by producing an aqueous emulsion of the components of the coating composition and then spraying this emulsion onto the granules of a biologically active agent. This process avoids the prior art problem of using organic solvents to prepare coated compositions for administration to ruminants. In a preferred embodiment, the composition is prepared by dissolving the chitosan in an aqueous solution of carboxylic acid(s) containing 3 to 6 carbon atoms, then adding the fat(s) to produce an aqueous emulsion.

The process for preparing a composition according to the present invention can comprise first preparing an aqueous solution which contains 2% by weight of a chitosan salt, either by dissolving a solid chitosan salt in water or by adding chitosan to an aqueous solution of an organic or inorganic acid capable of forming a water-soluble chitosan salt. According to an even more preferred embodiment of the invention, a solution containing approximately 0.5 to 0.75% by weight of carboxylic acid in water is prepared and then approximately 1.25% by weight of chitosan is added to the aqueous carboxylic acid solution. To the aqueous solution containing 2% by weight of a chitosan salt, which solution can optionally be diluted, is added the fat or mixture of fats which has a melting point of less than 25° C., followed by, in a molten state, the fat or mixture of fats which has a melting point of more than 50° C. The resulting mixture is agitated preferably using a POLYTRON type apparatus. A stable emulsion is obtained, which may then be sprayed onto granules of a biologically active agent by techniques known to those of skill in the art, such as the fluidized bed technique described in U.S. Pat. No. 2,799,241 and European Patent Application EP 0,188,953, the disclosures of which are herein specifically incorporated by reference.

The granules obtained after coating are used for feeding or for the medicinal treatment of ruminants.

The following examples are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

Preparation of an acetic acid solution of chitosan:

A 3-liter glass vessel was charged with:

15 g of chitosan 580.4 g of demineralized water 4.62 g of 100% acetic acid.

The resulting mixture was agitated at room temperature until the chitosan dissolved. The solution was then filtered through a 60 μm mesh polyester cloth to remove insoluble particles (0.41 g).

Preparation of an emulsion for film-coating:

The solution obtained above was diluted with 600 g of demineralized water to obtain a 1.2% solution of chitosan. 209.7 g of this solution were placed in a 2-liter glass vessel and 0.425 g of PROLABO purified oleic acid were added. The resulting mixture was heated to 90°–95° C. using a water bath.

76.5 g of PRIFAC 2981 stearic acid (UNICHEMA), mixed with 5.525 g of PROLABO purified oleic acid or with a mixture as shown in Tables 1 to 6, previously melted in a jacketed dropping-funnel heated to 110° C., is then introduced over about three minutes. During introduction, the mixture is dispersed in a POLYTRON apparatus rotating at 15,000 rpm. Stirring is continued for two minutes after all the molten fat has been added. A homogeneous and stable dispersion is obtained, which is stored around 90° C.

Coating of methionine granules or methionine/lysine hydrochloride granules:

500 g of methionine granules (example 3) or methionine/lysine hydrochloride granules (example 18), prepared by spheronization extrusion in the molten state as described in French Patent application No. 91/08,280 and U.S. Pat. No. 719,309, the disclosures of which are incorporated herein by reference, utilizing as a binder a mixture of ethylcellulose and stearic acid, were placed in a UNIGLATT spray-coating apparatus equipped with a WURSTER system. The particles have a diameter of between 2.0 and 2.5 mm. The methionine titer was 88.8% for the methionine granules and the lysine hydrochloride titer was 47% and the methionine titer was 13% for the methionine/lysine hydrochloride cogranules.

The emulsion prepared above was then pumped and sprayed with hot air in the UNIGLATT apparatus onto the bed of fluidized particles. The following film-coating conditions were employed:

fluidization air flow rate: 130 m³/h fluidization air temperature (at outflow): 40° C. (48° C. to 50° C. for the cogranules)

spraying air pressure: 1.5 bar coating emulsion flow rate: 10.4 g/min (14.1 g/min for the cogranules)

spraying air temperature: 90° C. (80° C. for the cogranules)

spraying time: 40 min.

Total amount of emulsion sprayed: approximately 414 g for the methionine granules and approximately 602 g for the methionine/lysine hydrochloride cogranules.

567.5 g of film coated granules having a methionine titer of 78.4% and a coating content of 11.7% (example 3) and 640 g of cogranules having a lysine hydrochloride titer of 47.1% and a coating content of 21.2% (example 18) were obtained.

In vitro evaluation of the protection-release characteristic of the film-coated granules (Example 3):

In a buffer medium at pH 6 and 40° C., the degree of retention of these granules after 24 hours is 99.45%. At pH 2, 75% of the methionine was released in 7 to 8 hours.

The other examples are prepared according to the same procedure described above, but with different amounts of components and/or different mixtures of fats. The results are shown in Tables 1 to 5.

In sacco evaluation of the protection-release characteristics of the film-coated granules (Example 3):

1.5 g of the film-coated methionine granules (example 3) were placed in nylon sachets measuring 6×6 cm and having a mesh diameter of 48 μm. 1 Ruminal sachet (20×20 cm, 100 μm mesh) containing 15 of the granule-containing sachets was introduced into the rumen of a cannulated cow. The sachets were left for 24 hours and then recovered. The recovered sachets were washed with clear water and then 3 of the sachets were dried in an oven and weighed.

The remaining 12 sachets were immersed for 2.5 hours in a solution of pepsin at pH 2 (3 g of pepsin with an activity of 300 to 600 IU/ml/l) and then reintroduced into the cow via a duodenal cannula at the evening meal. The sachets were collected in the feces the following morning at 8 a.m. and then washed with water, dried and weighed.

At each step, the residual methionine was measured. The methionine available to the animal is determined by the difference in the methionine contained after passage through the rumen and the methionine contained in the feces divided by the methionine contained in the initial granule. The results are shown in Table 6.

In vivo evaluation of the protection-release characteristics of the film-coated granules (Example 3):

Four cows cannulated in the rumen and the duodenum were fed a mixture of corn silage and hay, and a portion of them received a supplement of protected methionine in the form of 50 g of the film-coated granules (example 3) per animal given in four equal parts four times a day. The plasma methionine concentration was measured and found to be 0.68 mg/100 g, as compared to a control group which had a plasma concentration of 0.23 mg/100 g. The methionine flux in the duodenum was 33.7 g/d above that of the control group; this flux corresponded to an ingested quantity of methionine of 38.3 g/d (50 g of granule containing 76.6% methionine).

EXAMPLE 2

Preparation of a chitosan solution:

The following were charged to a 1 liter glass container:

12.5 g of chitosan 981.9 g of demineralized water 5.6 g of 99% butyric (butanoic) acid.

The mixture was stirred at room temperature until the chitosan had dissolved (65 hours at room temperature: 1 hour at 50° C.). The solution was then filtered through polyester cloth with a mesh size of 60 μm in order to remove insoluble solid particles (0.81 g).

Preparation of a film-forming emulsion:

436.3 g of the above solution were taken and diluted with 76.4 g of demineralized water. A 1% chitosan solution was thus obtained. This solution was charged to a one liter glass container. The mixture was heated to 90°–95° C. with a water bath.

113.5 g of Prifac 2981 (Unichema) stearic acid, mixed with 50.8 g of purified Prolabo oleic acid, melted beforehand in a double-jacketed dropping funnel heated to 130° C., were then added over approximately three minutes. During the addition, the mixture was dispersed using a Rushton turbine rotating at 1300 revolutions per minute. The mixing continued for an additional two minutes after the molten lipids were added.

A homogeneous and stable dispersion was obtained, which was stored at a temperature in the region of 95° C. The emulsions of Tests 1–8 and 10, the compositions of which are described in Table 7, were produced according to the same procedure.

Coating of methionine/lysine hydrochloride cogranules:

500 g of methionine/lysine hydrochloride cogranules, prepared by molten extrusion/spheronization according to U.S. Pat. No. 5,290,560, the disclosure of which is incorporated herein by reference, were charged to a Uniglatt spray-coating device equipped with a Würster system. These granules had particle diameters ranging from 1.5 to 2.5 mm. Their assay was approximately 64% lysine.HCl and 22% methionine.

The above emulsion, still maintained at 95° C., was then pumped and sprayed into the Uniglatt device on the bed of particles fluidized by a stream of hot air.

The following film-forming conditions were applied:

fluidization air flow rate: 130 m3/h fluidization air temperature (at the outlet): 45° C.

fluidization air temperature (at the inlet): 75° to 85° C.

spraying air pressure: 1.5 bar mean flow rate of coating emulsion: 15 g/min spraying air temperature: 80° C.

temperature of the emulsion: 95° C.

spraying time: approximately 40 min

Total amount of emulsion sprayed: approximately 559.6 g for the lysine/methionine cogranules.

634.2 g of film-coated granules were thus obtained with a lysine.HCl assay of 50.25% and a degree of coating agent of 21%. The same granules were coated with the other emulsions (the compositions of which are described in Table 7) and with substantially equal degrees of coating agent.

In vitro evaluation of the protection-release characteristics of the film-coated granules:

After 24 hours in buffer medium at pH 6, at 40° C., the degree of retension of these granules was greater than 94%. At pH 2, over 6 hours, the degree of release of lysine was 100%.

The results relating to Tests 1–8 and 10 are shown in Table 8.

TABLE 1

VARIATION OF THE CONTENT OF FAT, OR OF ITS NATURE, HAVING A MELTING POINT BELOW 20° C.

| EX | Coating composition weight % | | Methionine content | Coating content | | Methionine released | | | | | |
|---|---|---|---|---|---|---|---|---|---|---|---|
| | | | | | | 1 H | 2 H | 3 H | 6 H | 15 H | 24 H |
| 1 | Chitosan | 3.0 | | | pH 2 | | | | | | |
| | Stearic acid | 96.5 | 76.9 | 12.0 | pH 6 | | | | | | 15.9 |
| 2 | Chitosan | 3.0 | | | pH 2 | 19.2 | 42.5 | 50.9 | 90.7 | 100 | |
| | Stearic acid | 92.0 | 76.8 | 13.4 | | | | | | | |
| | Oleic acid | 5.0 | | | pH 6 | | | | | 5.7 | 11.8 |
| 3 | Chitosan | 3.0 | | | pH 2 | 12.8 | 24.0 | 36.3 | 69.5 | 100 | |
| | Stearic acid | 90.0 | 78.4 | 11.7 | | | | | | | |
| | Oleic acid | 7.0 | | | pH 6 | | | | | 0.3 | 0.55 |
| 4 | Chitosan | 3.0 | | | pH 2 | 8.20 | 19.4 | 24.7 | 51.1 | 100 | |
| | Stearic acid | 87.0 | 77.4 | 12.9 | | | | | | | |
| | Oleic acid | 10.0 | | | pH 6 | | | | | 0.40 | 0.65 |
| 5 | Chitosan | 3.0 | | | pH 2 | 7.8 | 17.6 | 21.9 | 50.0 | 56.7 | 100 |
| | Stearic acid | 87.0 | 76.1 | 13.3 | | | | | | | |
| | Rapseed oil | 10.0 | | | pH 6 | | | | | 3.75 | 7.75 |

TABLE 2

VARIATION OF THE MIXTURE OF FATS HAVING A MELTING POINT ABOVE 50° C.

| EX | Coating composition weight % | | Methionine content | Coating content | | Methionine released | | | | | |
|---|---|---|---|---|---|---|---|---|---|---|---|
| | | | | | | 1 H | 2 H | 3 H | 6 H | 15 H | 24 H |
| 6 | Chitosan | 3.0 | | | pH 2 | 7.4 | 18.5 | 26.0 | 52.8 | 100 | |
| | Stearic acid | 86.5 | 79.3 | 10.7 | | | | | | | |
| | Lauric acid | 10.0 | | | pH 6 | | | | | 1.1 | 2.1 |
| | Oleic acid | 0.5 | | | | | | | | | |
| 7 | Chitosan | 3.0 | | | pH 2 | 11.1 | 20.7 | 32.4 | 60.7 | 100 | |
| | Stearic acid | 86.5 | 78.7 | 12.8 | | | | | | | |
| | Myristic acid | 10.0 | | | pH 6 | | | | | 5.9 | 14.4 |
| | Oleic acid | 0.5 | | | | | | | | | |
| 8 | Chitosan | 3.0 | | | pH 2 | 12.4 | 26.6 | 37.9 | 69.2 | 100 | |
| | Stearic acid | 86.5 | 76.9 | 12.8 | | | | | | | |
| | Behenic acid | 10.0 | | | pH 6 | | | | | 4.2 | 10.0 |
| | Oleic acid | 0.5 | | | | | | | | | |

TABLE 3

| EX | Coating composition weight % | | Methionine content | Coating content | | Methionine released | | | | | |
|---|---|---|---|---|---|---|---|---|---|---|---|
| | | | | | | 1 H | 2 H | 3 H | 6 H | 15 H | 24 H |
| 9 | Chitosan | 3.0 | 77.1 | 13.2 | pH 2 | 6.9 | 18.6 | 23.9 | 70.1 | | |
| | Stearic acid | 28.95 | | | | | | | | | |
| | Glyc. trimyrist. | 67.55 | | | | | | | | | |
| | Oleic acid | 0.5 | | | pH 6 | 0.2 | 0.2 | 0.2 | 0.6 | 1.10 | 3.00 |
| 10 | Chitosan | 3 | 77.8 | 12.4 | pH 2 | 12.1 | | 41.40 | 80.1 | | |
| | Glyc. trimyrist. | 29.10 | | | | | | | | | |
| | Stearic acid | 67.00 | | | pH 6 | 0.20 | 0.20 | 0.20 | 0.30 | | 1.70 |
| 11 | Chitosan | 1.5 | 77.1 | 13.2 | pH 2 | 2.80 | 9.70 | 17.9 | 49.1 | | |
| | Stearic acid | 29.4 | | | | | | | | | |
| | Glyc. trimyrist. | 68.6 | | | | | | | | | |
| | Oleic acid | 0.5 | | | pH 6 | | 0.30 | 0.50 | 2.20 | | 40.0 |
| 12 | Chitosan | 3 | 78.8 | 11.3 | pH 2 | 8.60 | 12.9 | 29.9 | 65.2 | | |
| | Stearic acid | 67.55 | | | | | | | | | |
| | Glyc. trimyrist | 28.95 | | | | | | | | | |
| | Oleic acid | 0.5 | | | pH 6 | 0.20 | 0.20 | 0.20 | 0.20 | 0.40 | 0.80 |

TABLE 4

| EX | Coating composition weight % | | Methionine content | Coating content | | Methionine released | | | | | |
|---|---|---|---|---|---|---|---|---|---|---|---|
| | | | | | | 1 H | 2 H | 3 H | 6 H | 15 H | 24 H |
| 13 | Chitosan | 3.0 | 75.8 | 12.5 | pH 2 | 13.9 | 29.8 | 48.0 | 80.6 | | |
| | Stearic acid | 28.95 | | | | | | | | | |
| | Compritol | 67.55 | | | | | | | | | |
| | Oleic acid | 0.5 | | | pH 6 | 0.6 | 0.8 | 2.7 | 7.2 | 13.6 | 23.3 |
| 14 | Chitosan | 6.0 | 76.7 | 11.6 | pH 2 | 25.3 | 39 | 56.5 | 96.6 | | |
| | Stearic acid | 28.05 | | | | | | | | | |
| | Compritol | 65.45 | | | pH 6 | 1.2 | 3.5 | 5.0 | 15.6 | 33.5 | 51.2 |
| | Oleic acid | 0.5 | | | | | | | | | |
| 15 | Chitosan | 3 | 79.4 | 10.6 | pH 2 | 27.1 | 49.3 | 69.7 | 100 | | |
| | Stearic acid | 82 | | | | | | | | | |
| | Géléol | 14.5 | | | | | | | | | |
| | Oleic acid | 0.5 | | | pH 6 | 0.3 | 0.6 | 1 | 2 | 6 | 10.8 |
| 16 | Chitosan | 3 | 78.1 | 12.0 | pH 2 | 21.1 | 42.6 | 61 | 97.7 | | |
| | Stearic acid | 67.5 | | | | | | | | | |
| | Géléol | 29 | | | pH 6 | 0.2 | 0.25 | 0.4 | 0.9 | | 7.4 |
| | Oleic acid | 0.5 | | | | | | | | | |

TABLE 5

VARIATION OF THE BIOLOGICALLY ACTIVE SUBSTANCE

| EX | Methionine/lycine HCl content | Coating composition | | Coating content | | Lycine HCl released | | | | | |
|---|---|---|---|---|---|---|---|---|---|---|---|
| | | | | | | 1 H | 2 H | 3 H | 6 H | 15 H | 24 H |
| 17 | 13.3:47.1 | Chitosan | 2.0 | 21.7 | pH 2 | 1 | 4.6 | 26.5 | 63.4 | 100 | |
| | | Stearic acid | 68.0 | | | | | | | | |
| | | Oleic acid | 30.0 | | pH 6 | | | | | 1 | 6.4 |
| 18 | 13.0:47.1 | Chitosan | 3.0 | 21.2 | pH 2 | 7.3 | 25.4 | 43.9 | 80 | 100 | |
| | | Stearic acid | 67.0 | | | | | | | | |
| | | Oleic acid | 30.0 | | pH 6 | | | | | 0.8 | 8.7 |
| 19 | 13.2:47 | Chitosan | 5.0 | 21.4 | pH 2 | 7.2 | 31.2 | 53.6 | 85.7 | 100 | |
| | | Stearic acid | 65.0 | | | | | | | | |
| | | Oleic acid | 30.0 | | pH 6 | | | | | 4.7 | 10.9 |

TABLE 6

| | Initial methionine 76.6% | | | | Initial methionine 75.4% | | | |
|---|---|---|---|---|---|---|---|---|
| | Cow No. 1 | Cow No. 2 | Cow No. 3 | Cow No. 4 | Cow No. 5 | Cow No. 6 | Cow No. 7 | Cow No. 8 |
| Rumen | 67.7 | 73.9 | 73.9 | 73.8 | 63 | 73.4 | 73.5 | 72.5 |
| Rumen + Pepsin HCl | 51.7 | 71.1 | 66.7 | 66.8 | 35.4 | 69.2 | 61.5 | 59.7 |
| Rumen + Pepsin HCl + intestine | 0.1 | 0.4 | 0.1 | 1.3 | 0.04 | 0.6 | 0.04 | 2.5 |

TABLE 6-continued

|  | Initial methionine 76.6% | | | | Initial methionine 75.4% | | | |
| --- | --- | --- | --- | --- | --- | --- | --- | --- |
|  | Cow No. 1 | Cow No. 2 | Cow No. 3 | Cow No. 4 | Cow No. 5 | Cow No. 6 | Cow No. 7 | Cow No. 8 |
| Methionine available to the animal | 88.3 | 96 | 96.4 | 94.6 | 83.5 | 96.6 | 97.4 | 93 |

TABLE 7

| Test | Acid | % acid by weight | % chitosan (by weight) | $CO_2H/NH_2$ (molar) | Solubilization time | % dissolved | pH |
| --- | --- | --- | --- | --- | --- | --- | --- |
| 1 | Propionic | 0.479 | 1.25 | 1.05 | 96 h at room T. | 95 | 4.8 |
| 2 | n-Valeric | 0.654 | 1.25 | 1.05 | 72 h at room T. | 93.5 | 4.6 |
| 3 | Formic | 0.297 | 1.25 | 1.05 | 63 h at room T. | 100 | 4.07 |
| 4 | Acetic | 0.385 | 1.25 | 1.05 | 48 h at room T. | 97.5 | 4.6 |
| 5 | Lactic | 0.58 | 1.25 | 1.05 | 72 h at room T. | 97.2 | 4.95 |
| 6 | Adipic | 0.937 | 1.25 | 1.05 | 48 h at room T. + 2 h at 80° C. | 97.9 | 3.9 |
| 7 | Glutamic | 0.945 | 1.25 | 1.05 | 72 h at room T. | 98.3 | 4.73 |
| 8 | Hydrochloric | 0.233 | 1.25 | 1.05 | 72 h at room T. | 100 | 2.09 |
| 9 | Butyric | 0.56 | 1.25 | 1.05 | 65 h at room T. + 1 h at 50° C. | 93.5 | 4.76 |
| 10 | 30/70 (molar) acetic/caproic mixture | 0.631 | 1.25 | 1.05 | 90 h at room T. + 1.5 h at 80° C. | 89.6 | 4.78 |

TABLE 8

|  |  | Degree of protection at pH 6/40° C. (% lysine) | | Degree of release at pH 2 |
| --- | --- | --- | --- | --- |
| Test | Acid | 24 h | 48 h | 6 h |
| 1 | Propionic | 95 | 25 | 100% |
| 2 | n-Valeric | 100 | 90 | 100% |
| 3 | Formic | 2.5 | 0 |  |
| 4 | Acetic | 90 | 16 |  |
| 5 | Lactic | 21.5 | 0 |  |
| 6 | Adipic | 3 | 0 |  |
| 7 | Glutamic | 0 | 0 |  |
| 8 | Hydrochloric | 6.5 | 0 |  |
| 9 | Butyric | 94.5 | 74.5 | 100% |
| 10 | 30/70 (molar) acetic/caproic mixture | 91 | 59 | 100% |

Although preferred embodiments of the invention are described herein in detail, it will be understood by those skilled in the art that variations may be made thereto without departing from the spirit of the invention or the scope of the appended claims.

What is claimed is:

1. A composition for administration to ruminants, comprising a biologically active substance coated with a coating composition which comprises:

(a) a chitosan salt, said salt being present in said coating composition in an amount greater than 0% by weight of said coating composition, expressed in chitosan equivalents, and not greater than 10% by weight of said coating composition, expressed in chitosan equivalents; and (b) a fat or a mixture of fats which has a melting point of more than 45° C., wherein at least 80% of the biologically active substance in said composition is retained in the rumen without degradation for at least six hours and wherein at least 50% of the biologically active substance is released in the abomasum and/or intestine in less than six hours.

2. The composition of claim 1, wherein said chitosan is present in said coating composition in an amount of at least 1% by weight of said coating composition, expressed in chitosan equivalents, and not greater than 10% by weight of said coating composition, expressed in chitosan equivalents.

3. A composition for administration to ruminants, comprising a biologically active substance coated with a coating composition which comprises:

(a) from 1 to 10% by weight of a chitosan salt, expressed in chitosan equivalents; and (b) from 99 to 90% by weight of a fat or a mixture of fats which has a melting point of more than 45° C.

4. The composition of claim 3, wherein said chitosan salt is present in an amount ranging from 1 to 5% of said chitosan salt, expressed in chitosan equivalents and said fat or mixture of fats is present in an amount ranging from 99% to 95% by weight.

5. A composition for administration to ruminants, comprising a biologically active substance coated with a coating composition which comprises:

(a) from 3 to 5% of a chitosan salt, expressed in chitosan equivalents;

(b) from 45 to 97% of a fat or a mixture of fats which has a melting point of more than 50° C.; and (c) from 0 to 50% of a fat or a mixture of fats which has a melting point of less than 25° C.

6. The composition of claim 5, wherein if (c) is greater than 0%, the melting point of the combination of said mixture of fats (b) and (c) is more than 45° C.

7. The composition of claim 5, wherein said coating composition comprises:

(a) from 3 to 5% of a chitosan salt, expressed in chitosan equivalents;

(b) from 55 to 92% of a fat which has a melting point of more than 50° C.; and (c) from 5 to 40% of a fat or a mixture of fatty acids which has a melting point of less than 25° C.

8. The composition of claim 7, wherein the melting point of the combination of said mixture of fats (b) and (c) is more than 45° C.

9. The composition of claim 3, wherein said biologically active substance is methionine or lysine or a mixture thereof.

10. The composition of claim 3, wherein said chitosan salt is selected from chitosan chloride, chitosan acetate, chitosan adipate, chitosan citrate, chitosan formate, chitosan glutamate, chitosan lactate, chitosan malonate, chitosan oxalate, chitosan propionate, chitosan pyruvate, chitosan succinate and chitosan tartrate.

11. The composition of claim 10, wherein said chitosan salt is chitosan acetate.

12. The composition of claim 5, wherein said fat or mixture of fats which has a melting point of more than 50° C. is a fatty acid, fatty acid ester, a fatty alcohol, paraffin, hydrogenated vegetable or animal oil, wax, or mixtures thereof.

13. The composition of claim 12, wherein said fat or mixture of fats which has a melting point of more than 50° C. is stearic acid, behenic acid, lauric acid, myristic acid, or stearin.

14. The composition of claim 12, wherein said fat or mixture of fats which has a melting point of more than 50° C. is a monoester, diester or triester of glycerol with a fatty acid.

15. The composition of claim 5, wherein said fat or mixture of fats which has a melting point of less than 25° C. is at least one unsaturated fatty acid having from 12 to 22 carbon atoms.

16. The composition of claim 15, wherein said fat or mixture of fats which has a melting point of less than 25° C. is oleic acid, rapeseed oil, sunflower oil, coconut oil, ground nut oil, corn oil, or olive oil.

17. The composition of claim 5, wherein said biologically active substance is methionine and said coating composition comprises:

(a) 3% of a chitosan salt, expressed in chitosan equivalents;

(b) 90% of stearic acid; and (c) 7% of oleic acid.

18. The composition of claim 5, wherein said biologically active substance is in the form of a granule having a diameter of from 0.6 to 2.5 mm.

19. The composition of claim 5, wherein said coating has a thickness of from 20 to 200 μm.

20. The composition of claim 19, wherein said coating has a thickness of from 60 to 120 μm.

21. The composition of claim 18, comprising 60 to 90% by weight of said biologically active substance and 4 to 25% by weight of said coating composition.

22. A process for preparing the composition of claim 18, which comprises spraying an aqueous emulsion of said coating composition onto said granules of said biologically active substance.

23. The process of claim 22, which comprises:

(a) preparing an aqueous solution of said chitosan salt;

(b) adding to said solution said fat or mixture of fats which has a melting point of less than 25° C.;

(c) adding said fat or mixture of fats which has a melting point of more than 50° C. with agitation to the combination of said chitosan salt and said fat recited in (b) to form an emulsion; and (d) spraying said emulsion onto said granules of said biologically active substance.

24. A composition for administration to ruminants, comprising at least 60% by weight of the composition of a biologically active substance coated with no more than 40% by weight of the composition of a coating composition which comprises:

(a) a chitosan salt, said salt being present in said coating composition in an amount greater than 0% by weight of said coating composition, expressed in chitosan equivalents, and not greater than 10% by weight of said coating composition, expressed in chitosan equivalents; and (b) a fat or a mixture of fats which has a melting point of more than 45° C., wherein the biologically active substance in said composition is substantially retained in the rumen without degradation for at least six hours and wherein the biologically active substance is substantially released in the abomasum and/or intestine in six hours.

25. The composition of claim 24, wherein said biologically active substance is in the form of a granule having a diameter of from 0.6 to 2.5 mm, wherein said biologically active substance is from 75 to 80% by weight of the composition, and wherein said coating composition is from 10 to 15% by weight of the composition.

26. The composition of claim 24, wherein said biologically active substance is in the form of a granule having a diameter of from 0.6 to 2.5 mm, wherein said biologically active substance is from 60 to 65% by weight of the composition, and wherein said coating composition is from 20 to 25% by weight of the composition.

27. The composition of claim 24, wherein said biologically active substance is in the form of a granule having a diameter of from 0.6 to 2.5 mm, wherein said biologically active substance is from 60 to 90% by weight of the composition, and wherein said coating composition is from 4 to 25% by weight of the composition.

28. A composition for administration to ruminants, comprising at least one biologically active substance in granular form coated with a coating composition which comprises:

(a) from 1 to 5% by weight of at least one chitosan salt, expressed in chitosan equivalents, wherein said chitosan salt is a salt of a monocarboxylic organic acid that may be substituted by an alkyl chain, wherein the main alkyl chain of said monocarboxylic organic acid carrying the carboxyl group contains 3 to 6 carbon atoms; and (b) from 99 to 95% by weight of a fat or a mixture of fats that has a melting point of greater than 45° C.

29. The composition of claim 28, wherein said chitosan salt is a salt of a monocarboxylic organic acid substituted by an alkyl group containing 1 to 3 carbon atoms.

30. The composition of claim 28, wherein said coating composition comprises:

(a) from 3 to 5% by weight of said chitosan salt, expressed in chitosan equivalents, wherein said chitosan salt is a salt of a monocarboxylic organic acid selected from propionic acid, butyric acid, valeric acid, and caproic acid, and further wherein said chitosan salt is a salt of a mixture of one of said monocarboxylic organic acids and at least one carboxylic acid having a shorter alkyl chain than the main alkyl chain of said monocarboxylic organic acid;

(b) from 55 to 92% by weight of a fat or a mixture of fats that has a melting point of greater than 50° C.; and (c) from 5 to 40% by weight of a fat or a mixture of fats that has a melting point of less than 25° C.

31. The composition of claim 28, wherein said chitosan salt is valerate.

32. The composition of claim 30, wherein said chitosan salt is a salt of a mixture of caproic acid and acetic acid.

33. The composition of claim 28, wherein said biologically active substance is selected from methionine and/or lysine.

34. The composition of claim 30, wherein said fat or said mixture of fats that has a melting point of greater than 50° C. is selected from fatty acids containing 12 to 22 carbon atoms, fatty acid esters, fatty alcohols containing 12 to 22 carbon atoms, paraffins, hydrogenated vegetable or animal oils, and hydrogenated vegetable or animal waxes.

35. The composition of claim 34, wherein said fat or said mixture of fats that has a melting point of greater than 50° C. is selected from stearic acid, behenic acid, lauric acid, myristic acid, stearin, beef tallow, rice wax, beeswax, candelita wax, carnauba wax, and lanolin.

36. The composition of claim 30, wherein said fat or said mixture of fats that has a melting point of less than 25° C. is selected from unsaturated fatty acids having from 12 to 22 carbon atoms.

37. The composition of claim 36, wherein said fat or said mixture of fats that has a melting point of less than 25° C. is selected from oleic acid, rapeseed oil, sunflower oil, coconut oil, groundnut oil, corn oil, and olive oil.

38. The composition of claim 28, wherein said biologically active substance is a cogranule of methionine/lysine hydrochloride and wherein said coating composition contains:

(a) 3% of chitosan valerate;

(b) 67% of stearic acid; and (c) 30% of oleic acid.

39. The composition of claim 30, wherein said biologically active substance is a cogranule of methionine/lysine hydrochloride and wherein said coating composition contains:

(a) 3% of a salt of a mixture of caproic acid and acetic acid;

(b) 67% of stearic acid; and (c) 30% of oleic acid.

40. The composition of claim 28, wherein the amount of said monocarboxylic organic acid used is about 1 mole per free amine group of the chitosan.

41. The composition of claim 28, wherein said granule of biologically active substance has a diameter ranging from about 0.6 to 2.5 mm.

42. The composition of claim 28, which comprises from about 60 to 90% of biologically active substance in granular form and from about 4 to 25% by weight of said coating composition.

43. The composition of claim 28, wherein said composition is a nutrient or medicinal composition.

44. A process for preparing the composition of claim 28, which comprises spraying an aqueous emulsion of said coating composition onto granules of said biologically active substance.

45. The process of claim 44, which comprises the following steps:

(a) dissolving chitosan by stirring said chitosan in an aqueous solution of a monocarboxylic organic acid that may be substituted by an alkyl chain, wherein the main alkyl chain of said monocarboxylic organic acid carrying the carboxyl group contains 3 to 6 carbon atoms, or in an aqueous solution of a mixture of one of said monocarboxylic organic acids and at least one carboxylic acid having a shorter alkyl chain than the main alkyl chain of said monocarboxylic organic acid, to prepare at least one chitosan salt;

(b) adding the fat or mixture of fats that has a melting point of less than 25° C. to said at least one chitosan salt;

(c) adding to the combination resulting from step (b), by stirring, the fat or mixture of fats that has a melting point of greater than 50° C. to form an emulsion; and (d) spraying said emulsion onto biologically active granules.

* * * * *